Aug. 13, 1935.   P. D. PERKINS   2,011,415
BUCKET
Filed Nov. 23, 1932

Inventor
Peyton D. Perkins
By R. Houston Brett
Attorney

Patented Aug. 13, 1935

2,011,415

UNITED STATES PATENT OFFICE 2,011,415

BUCKET

Peyton D. Perkins, Richmond, Va.

Application November 23, 1932, Serial No. 644,112

2 Claims. (Cl. 220—36)

My invention relates to buckets, and more particularly to such receptacles adapted for domestic purposes, although no restrictions are intended by the latter utilization thereof.

It is generally the practice to fill a bucket with a desired article, say ashes for instance, and then emit the article from the same outlet of the bucket. It is obvious from the foregoing that the bucket must be tilted and if it is desired to empty ashes from the bucket into another receptacle tilting is again necessary.

One of the objects of this invention is the provision of a bucket whereby the contents thereof may be emitted or dumped in direct fashion.

Another object of this invention is the provision of a bucket adapted to be provided with a movable bottom.

A further object is the provision of a receptacle provided with a handle in operative relation with said bottom.

Figure 1:
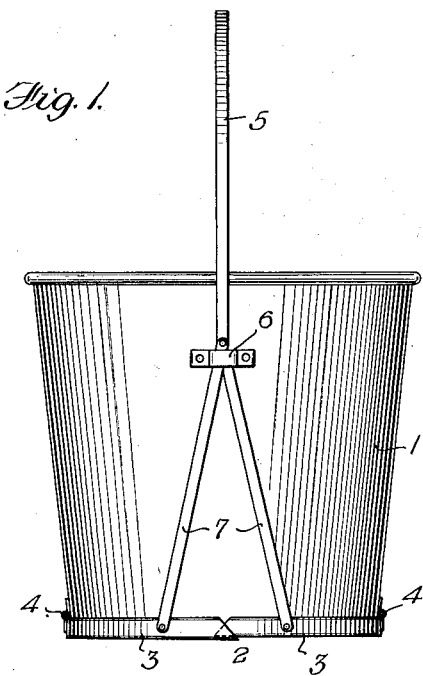
Figure 2:
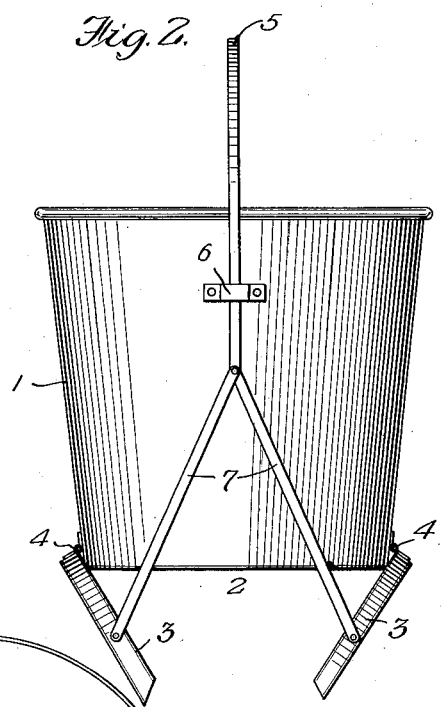
Figure 3:
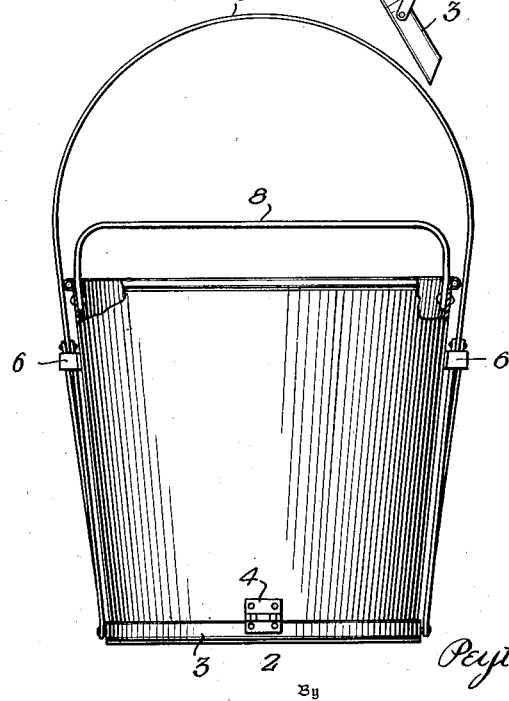

Other objects and features will more fully appear from the following description and accompanying drawing in which:

Fig. 1 is a vertical view of the bucket; Fig. 2 a similar view with the bottom open and Fig. 3 a sectional vertical view thereof.

Referring to the drawing, a bucket 1 is provided with a bottom 2 formed by sectional members 3 pivotally connected, by hinges 4, to said bucket, so as to permit said members to pivot freely, into both closed and open positions.

A handle 5 is adapted to register and be movable in brackets 6 secured in diametrically opposed fashion on the outside of said bucket. Two pairs of links 7 respectively connect the ends of said handle in pivotal fashion and are coupled, respectively, to the sectional members, so that when the handle is actuated while the body of bucket is fixed, a force is exerted through the handle, and links, which naturally moves said sections.

A handle 8 is pivotally connected to the inside of said bucket so as to hold the body portion 9, of said bucket, in a substantial fixed position thereby permitting the bottom to open while one is holding said handle 8.

Applicant may use the same construction in rope receptacles as well as wooden and concrete buckets.

Having described my invention, I claim:

1. In a bucket consisting of a body portion; a handle pivotally connected to the inside of said body portion; a bottom consisting of section pivotally connecting the basal portion of said body; links respectively connecting said bottom sections; a handle connecting said links at one point; brackets diametrically opposed to each other and secured to said bucket and straddling the handle in a position to permit a portion of said links to pass therein.

2. In a device of the character described consisting of a body portion provided with a handle extending across the interior of the said body portion and pivotally connected thereto; a bottom consisting of sections connected pivotally to said body portion links engaging said body portion and connecting a second handle in a position to permit a portion of said links to pass therein.

PEYTON D. PERKINS.